US011227275B2

(12) United States Patent
Van Heerden et al.

(10) Patent No.: US 11,227,275 B2
(45) Date of Patent: Jan. 18, 2022

(54) PERSON-TO-PERSON ELECTRONIC PAYMENT PROCESSING

(71) Applicant: The Toronto-Dominion Bank, Toronto (CA)

(72) Inventors: Lauren Van Heerden, Bedford, NH (US); Prabaharan Sivashanmugam, Farmington Hills, MI (US); Dino D'Agostino, Richmond Hill (CA); Michael D. Cummins, Pickering (CA); Orin Del Vecchio, Richmond Hill (CA); Gunalan Nadarajah, Milton (CA); Steven Robert Langham, London (CA)

(73) Assignee: The Toronto-Dominion Bank, Toronto (CA)

( * ) Notice: Subject to any disclaimer, the term of this patent is extended or adjusted under 35 U.S.C. 154(b) by 444 days.

(21) Appl. No.: 15/695,628

(22) Filed: Sep. 5, 2017

(65) Prior Publication Data
US 2017/0364895 A1    Dec. 21, 2017

Related U.S. Application Data

(63) Continuation of application No. 14/273,425, filed on May 8, 2014, now abandoned.
(Continued)

(51) Int. Cl.
*G06Q 20/22* (2012.01)
*G06Q 20/10* (2012.01)
*G06Q 20/38* (2012.01)

(52) U.S. Cl.
CPC ........... *G06Q 20/223* (2013.01); *G06Q 20/10* (2013.01); *G06Q 20/383* (2013.01); *G06Q 20/3829* (2013.01)

(58) Field of Classification Search
CPC .. G06Q 20/223; G06Q 20/10; G06Q 20/3829; G06Q 20/383
(Continued)

(56) References Cited

U.S. PATENT DOCUMENTS 5,677,955 A    10/1997  Doggett et al.
6,289,323 B1    9/2001  Gordon et al.
(Continued)

FOREIGN PATENT DOCUMENTS

WO    2008/134275 A1    11/2008
WO    2010/114499 A2    10/2010
(Continued)

OTHER PUBLICATIONS

Schneier, B., "When Will We See Collisions for SHA-1?", retrieved from Schneier on Security (https://www.schneier.com/blog/archives/2012/10/when_will_we_se.html), Oct. 5, 2012, 27 pgs.
(Continued)

*Primary Examiner* — James D Nigh
(74) *Attorney, Agent, or Firm* — Duane Morris LLP (57) ABSTRACT

A payment processing method involves a server receiving a payee identifier, and linking the payee identifier to a device identifier identifying a payee device. The server receives from a payor device a payment initiation request identifying a specified payment amount and a payor identifier, links a unique token to the specified payment amount and to the payor identifier, and provides the payor device with the token. The token excludes the payor identifier and particulars of the associated payor. The server receives a payment completion request including the payee identifier and the token, and excluding the payment amount, the payor identifier and payor particulars. The server uses the payee identifier to confirm that the payment completion request was signed with the device identifier, uses the payee iden-
(Continued)

tifier to locate a payee account, and uses the token to determine the specified payment amount and a payor account associated with the payor identifier.

14 Claims, 4 Drawing Sheets

Related U.S. Application Data (60) Provisional application No. 61/821,228, filed on May 8, 2013.

(58) Field of Classification Search
USPC .......................................................... 705/64
See application file for complete search history.

(56) References Cited

U.S. PATENT DOCUMENTS

| | | | |
|---|---|---|---|
| 8,050,997 | B1 | 11/2011 | Nosek et al. |
| 8,195,576 | B1 | 6/2012 | Grigg et al. |
| 8,233,841 | B2 | 7/2012 | Griffin et al. |
| 8,275,312 | B2 | 9/2012 | Fisher |
| 8,290,876 | B1* | 10/2012 | Powell ............... G06Q 20/3274 705/64 |
| 8,321,922 | B1 | 11/2012 | Lo et al. |
| 8,327,141 | B2 | 12/2012 | Vysogorets et al. |
| 8,369,842 | B2 | 2/2013 | Proctor, Jr. et al. |
| 8,380,177 | B2 | 2/2013 | Laracey |
| 8,423,457 | B1 | 4/2013 | Schattauer et al. |
| 8,682,802 | B1* | 3/2014 | Kannanari ........... G06Q 20/367 705/65 |
| 9,419,841 | B1* | 8/2016 | Kozolchyk ......... H04L 67/1097 |
| 9,715,709 | B2* | 7/2017 | Carlson .................. G06Q 20/40 |
| 2003/0033257 | A1 | 2/2003 | Wankmueller |
| 2004/0180694 | A1 | 9/2004 | Lai et al. |
| 2007/0255653 | A1 | 11/2007 | Tumminaro et al. |
| 2008/0313047 | A1 | 12/2008 | Casares et al. |
| 2009/0089194 | A1 | 4/2009 | Mathis et al. |
| 2010/0078471 | A1 | 4/2010 | Lin et al. |
| 2010/0274678 | A1 | 10/2010 | Rolf et al. |
| 2010/0332841 | A1* | 12/2010 | Watts ..................... G06F 21/36 713/182 |
| 2011/0125610 | A1 | 5/2011 | Goodsall et al. |
| 2011/0189981 | A1 | 8/2011 | Faith et al. |
| 2011/0213707 | A1 | 9/2011 | Jackson et al. |
| 2011/0258685 | A1 | 10/2011 | Qiu et al. |
| 2011/0276479 | A1 | 11/2011 | Thomas |
| 2011/0320293 | A1 | 12/2011 | Khan |
| 2012/0166338 | A1 | 6/2012 | Agnelli et al. |
| 2012/0209749 | A1 | 8/2012 | Hammad et al. |
| 2012/0214416 | A1 | 8/2012 | Kent et al. |
| 2012/0215694 | A1 | 8/2012 | Vilmos |
| 2012/0231844 | A1 | 9/2012 | Coppinger |
| 2012/0239560 | A1 | 9/2012 | Pourfallah et al. |
| 2012/0240195 | A1 | 9/2012 | Weiss |
| 2012/0246079 | A1 | 9/2012 | Wilson et al. |
| 2012/0259780 | A1 | 10/2012 | Kang |
| 2012/0278155 | A1 | 11/2012 | Faith |
| 2012/0284131 | A1 | 11/2012 | Soffer et al. |
| 2012/0290478 | A1 | 11/2012 | Crofts et al. |
| 2012/0290609 | A1 | 11/2012 | Britt |
| 2012/0294443 | A1 | 11/2012 | Mathur et al. |
| 2012/0323766 | A1 | 12/2012 | Galindo et al. |
| 2013/0013433 | A1 | 1/2013 | Rose et al. |
| 2013/0040571 | A1 | 2/2013 | Wall et al. |
| 2013/0041830 | A1 | 2/2013 | Singh et al. |
| 2013/0054461 | A1 | 2/2013 | Gupta et al. |
| 2013/0060689 | A1 | 3/2013 | Oskolkov et al. |
| 2013/0073467 | A1 | 3/2013 | Underwood |
| 2013/0095754 | A1 | 4/2013 | Moreton et al. |
| 2013/0109307 | A1 | 5/2013 | Reisgies et al. |
| 2013/0191887 | A1 | 7/2013 | Davis et al. |
| 2013/0339188 | A1* | 12/2013 | Mohamed ............. G06Q 20/027 705/26.41 |
| 2014/0201075 | A1* | 7/2014 | King .................... G06Q 20/385 705/43 |
| 2014/0310172 | A1* | 10/2014 | Grossman .............. G06Q 20/42 705/44 |
| 2014/0358786 | A1 | 12/2014 | Van Heerden et al. |

FOREIGN PATENT DOCUMENTS

| | | | |
|---|---|---|---|
| WO | 2011/119633 | A1 | 9/2011 |
| WO | 2012/042262 | A1 | 4/2012 |
| WO | 2012/123394 | A1 | 9/2012 |
| WO | 2013/009288 | A1 | 1/2013 |
| WO | 2013/040684 | A1 | 3/2013 |

OTHER PUBLICATIONS

Marufuzzaman, M., Overview of SQL Server 2005/2008 Table Indexing (Part-1), Aug. 25, 2009, 13pgs. http://www.codeproject.com/Articles/39006/Overview-of-SQL-Server-Table-Indexing-Pa.

RSA Laboratories, "PKCS #1 v2.1: RSA Cryptography Standard (PKCS)", RSA Security Inc. Public-Key Cryptography Standards (PKCS), Jun. 14, 2002, 61 pgs.

"Generating Keys for Encryption and Decryption", .NET Framework 1.1, 2003, retrieved from https://msdn.microsoft.com/en-us/library/5e9ft273 (v=vs.71).aspx, Mar. 20, 2017, 7pgs.

Hoyer, P. et al., "RFC 6030—Portable Symmetric Key Container (PSKC)," Internet Engineering Task Force (IETF), Oct. 2010, 51 pgs. https://www.rfc-editor.org/rfc/rfc6030.txt.

Definition of Repudiation from Barron's Dictionary of Business Terms (Friedman, Dictionary of Business Terms, 2000), 2pgs.

Debit Cards Frequently Asked Questions, Washington State Department of Financial Institutions, retrieved from http://www.dfi.wa.gov/financial-education/information/debit-cards-frequently-asked-questions, 2014, 4pgs.

"Mobile and Alternative Payments in the U.S., 3rd Edition", PR Newswire, Jan. 29, 2013, 16pgs.

Zhang, L. et al.,"An Anonymous Digital Cash and Fair Payment Protocol Utilizing Smart Card in Mobile Environments," Proceedings of the 5th International Conference on Grid and Cooperative Computing Workshops, 2006, pp. 335-340.

Balan, R. et al., "mFerio: The Design and Evaluation of a Peer-to-Peer Mobile Payment System," Proceedings of the 7th International Conference on Mobile Systems, Applications, and Services, ACM, 2009, pp. 291-304.

Monteiro, D. et al., "A Secure NFC Application for Credit Transfer Among Mobile Phones," 2012 International Conference on Digital Object Identifiers, 5pgs.

Tuchscheerer, S. et al., "Secure Cashless Transactions on Mobile Bluetooth-Devices," Otto-von-Guericke University of Magdeburg, Germany, 2010, 12pgs.

Kadambi, K. et al., "Near-Field Communication-Based Secure Mobile Payment Service," Proceedings of the 11th International Conference on Electronic Commerce, 2009, pp. 142-151.

Wei, K. et al., "WhoPay: A Scalable and Anonymous Payment System for Peer-to-Peer Environments," 26th IEEE International Conference on Digital Object Identifiers, 2005, 15pgs.

Kreft, H. et al., "Wallet Based E-Cash System for Secured Multi-hop Cash Exchange," Information and Communication Technologies: From Theory to Applications, 2008, 5pgs.

Sekhar, V. et al., "A Secure Kiosk Centric Mobile Payment Protocol Using Symmetric Key Techniques," 7th IEEE International Conference on Digital Object Identifiers, 2012, 6pgs.

Alpar, G. et al., "Using NFC Phones for Proving Credentials," Proceedings of the 16th International GI/ITG Conference on Measurement, Modelling, and Evaluation of Computing Systems and Dependability and Fault Tolerance, 2012, 14pgs.

Almuairfi, S. et al., "Anonymous proximity mobile payment (APMP)," Peer-to-Peer Networking and Applications, 2012, 8pgs.

Smith, L., "Where's My Checkbook?! 5 Apps for Transferring Money to Your Roomie," May 22, 2012, 11pgs. www.apartmentlist.com/blog/wheres-my-checkbook-5-apps-for-transferring-money-to-your-roomie/.

(56) References Cited

OTHER PUBLICATIONS

FDIC Consumer News Winter 2012/2013, retrieved from https://www.fdic.gov/consumer/news/cnwin1213/stoppayment.html, Federal Deposit Insurance Corporation, 2pgs.
Susan Herbst-Murphy, "Clearing and Settlement of Interbank Card Transactions: A MasterCard Tutorial for Federal Reserve Payments Analysts," Discussion Paper Payment Cards Center—Federal Reserve Bank of Philadelphia, Oct. 2013, www.philadelphiafed.org/payment-cards-center/publications/discussion-papers/ (22 pages).

* cited by examiner

PERSON-TO-PERSON ELECTRONIC PAYMENT PROCESSING

CROSS-REFERENCE TO RELATED APPLICATIONS

This patent application is a continuation of U.S. patent application Ser. No. 14/273,425, filed May 8, 2014, and claims the benefit of the filing date of U.S. Provisional Patent Application No. 61/821,228, filed May 8, 2013, the disclosures of which are hereby incorporated herein by reference.

FIELD

This patent application relates to a method and network for processing electronic payments.

BACKGROUND

To make a person-to-person electronic payment, a payor may initiate an e-payment transfer through the payor's financial institution server. Using a web portal or a dedicated software application, the payor provides the payor's financial institution server with the intended payment amount, the payee's e-mail address or phone number, and a security question and answer. The financial institution server may issue to the payee an e-mail or text message that includes a link to the pending transaction, and identifies the payment amount and the payor. To accept the payment, the payee may use its computing device to select the transaction link, which causes the payee to authenticate to the payee's financial institution account and to be prompted for an answer to the security question. If the security answer provided by the payee corresponds with the security answer provided by the payor, the payor's financial institution server may effect a payment transfer from the payor's financial institution account to the payee's financial institution account.

Although e-payment transfers are convenient, to receive the payment, the payor must be provided with personal information of the payee (e.g. an e-mail address, a phone number, an answer to security question), and the payee receives personal information (e.g. a name, an e-mail address) of the payor. The payee could provide the payor with a generic e-mail account address or the phone number of a disposal mobile phone. However, the payee may wish not to provide the payor with any such personal information. Moreover, e-payment transfers may be subject to man-in-the-middle attacks that can intercept the payee's security answer, and direct the payment to an unauthorized account.

SUMMARY

The disclosed embodiments include a person-to-person e-payment processing server and computerized systems and methods that process electronic payments without exchanging personal information between payor and payee.

In some embodiments, a method of person-to-person electronic payment processing may involve a payment processing server receiving, from a payor payment device, a payment initiation request for a payment from a payor account. The payment initiation request may identify a payment amount of the payment and exclude particulars of the payee and particulars of a payee account.

The payment processing server may receive, from a payee payment device, a payment completion request requesting completion of the payment. The payment completion request may include a payee identifier and exclude the payment amount, the payor account and particulars of the payor.

The payment processing server may confirm that the payment completion request is uniquely associated with the payee payment device and the payee identifier, and may determine the payment amount, the payor account, and the payee account from the payment completion request. The payment processing server may determine the payment amount and the payor account by correlating the payment completion request with the payment initiation request. In accordance with an outcome of the confirming, the payment processing server may effect a transfer in the payment amount from the payor account to the payee account.

In certain aspects, there is also provided a payment processing server that includes a network interface, and a computer processing system that is coupled to the network interface. The computer processing system may be configured to receive, from a payor payment device, a payment initiation request for a payment from a payor account, the payment initiation request identifying a payment amount of the payment and excluding particulars of the payee and particulars of a payee account.

The computer processing system may be configured to receive, from a payee payment device, a payment completion request requesting completion of the payment. The payment completion request may include a payee identifier and exclude the payment amount, the payor account and particulars of the payor.

The computer processing system may be configured to (i) confirm that the payment completion request is uniquely associated with the payee payment device and the payee identifier, (ii) determine the payee account from the payment completion request, and (iii) determine the payment amount and the payor account by correlating the payment completion request with the payment initiation request. The computer processing system may also be configured to effect a transfer in the payment amount from the payor account to the payee account in accordance with an outcome of the confirming.

In other embodiments a method of person-to-person electronic payment processing may involve a payment processing server receiving, from a payee payment device, a payment completion request that includes a transaction pointer to transaction particulars of a financial transaction between a payor and a payee. The transaction particulars may include a payment amount and a payor account. The payment completion request may include a payee identifier and exclude the transaction particulars and particulars of the payor.

The payment processing server may confirm that the payment completion request is uniquely associated with the payee payment device and the payee identifier, may determine a payee account by querying an accounts database with the payee identifier, and may determine the payment amount and the payor account by querying a transactions database with the transaction pointer. In accordance with an outcome of the confirming, the payment processing server may effect a transfer in the payment amount from the payor account to the payee account.

In some aspects, a payment processing server includes a network interface, a transactions database, an accounts database, and a computer processing system that is in communication with the network interface and the databases. The computer processing system may be configured to receive, from a payee payment device via the network interface, a payment completion request that includes a transaction pointer to transaction particulars of a financial transaction between a payor and a payee. The transaction particulars may include a payment amount and a payor account. The payment completion request may include a payee identifier and may exclude the transaction particulars and particulars of the payor.

The computer processing system may be configured to (i) confirm that the payment completion request is uniquely associated with the payee payment device and the payee identifier, (ii) determine a payee account by querying the accounts database with the payee identifier, and (iii) determine the payment amount and the payor account by querying the transactions database with the transaction pointer. The computer processing system may also be configured to effect a transfer in the payment amount from the payor account to the payee account in accordance with an outcome of the confirming.

Since the payment processing server confirms that the payment completion request is uniquely associated with the payee payment device and the payee identifier prior to effecting the transfer, the likelihood of the payment being subject to a successful man-in-the-middle attack may be reduced.

The disclosed embodiments include, for example, a method of person-to-person anonymous electronic payment processing. The method may include receiving, by a payment processing server, and from a payor payment device, a payment initiation request for a payment from a payor account. In some aspects, the payment initiation request identifies a payment amount of the payment and excludes particulars of the payee and particulars of a payee account. The method may also include receiving, by the payment processing server, and from a payee payment device, a payment completion request requesting completion of the payment. In some aspects, the payment completion request may include a payee identifier, and may exclude the payment amount, the payor account and information associated with the payor. The method may also include confirming, by the payment processing server, that the payment completion request is uniquely associated with the payee payment device and the payee identifier, and determining, by the payment processing server, the payment amount, the payor account and the payee account from the payment completion request. In some aspects, the payment processing server may determine the payment amount and the payor account by correlating the payment completion request with the payment initiation request. The method may further include effecting, by the payment processing server, a transfer in the payment amount from the payor account to the payee account, in accordance with the confirmation.

The disclosed embodiments also include a payment processing server having a storage device and at least one processor coupled to the storage device. The storage device may store software instructions for controlling the at least one processor when executed by the at least one processor. In one embodiment, the at least one processor may be operative with the software instructions and may be configured to receive from a payor payment device a payment initiation request for a payment from a payor account. In some aspects, the payment initiation request may identify a payment amount of the payment, and may exclude particulars of the payee and particulars of a payee account. The at least one processor may be further configured to receive from a payee payment device a payment completion request requesting completion of the payment. In some aspects, the payment completion request may include a payee identifier, and may exclude the payment amount, the payor account and information associated with the payor. The at least one processor may be further configured to confirm that the payment completion request is uniquely associated with the payee payment device and the payee identifier, determine the payee account from the payment completion request, and determine the payment amount and the payor account by correlating the payment completion request with the payment initiation request. The at least one processor may be further configured to effect a transfer in the payment amount from the payor account to the payee account in accordance with an outcome of the confirming.

The disclosed embodiments also include a tangible, non-transitory computer-readable medium storing instructions that, when executed by at least one processor, perform a method of person-to-person anonymous electronic payment processing. The method may include receiving from a payor payment device, a payment initiation request for a payment from a payor account. In some aspects, the payment initiation request identifies a payment amount of the payment and excludes particulars of the payee and particulars of a payee account. The method may also include receiving from a payee payment device, a payment completion request requesting completion of the payment. In some aspects, the payment completion request may include a payee identifier, and may exclude the payment amount, the payor account and information associated with the payor. The method may also include confirming that the payment completion request is uniquely associated with the payee payment device and the payee identifier, and determining, by the payment processing server, the payment amount, the payor account and the payee account from the payment completion request. In some aspects, the payment processing server may determine the payment amount and the payor account by correlating the payment completion request with the payment initiation request. The method may further include effecting a transfer in the payment amount from the payor account to the payee account, in accordance with the confirmation.

BRIEF DESCRIPTION OF THE DRAWINGS

An exemplary e-payment processing network, payment processing server, and method of person-to-person electronic payment will now be described, with reference to the accompanying drawings, in which.

DETAILED DESCRIPTION

Reference will now be made in detail to disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, any section headings used herein are for organizational purposes only, and are not to be construed as limiting the subject matter described.

Figure 1:
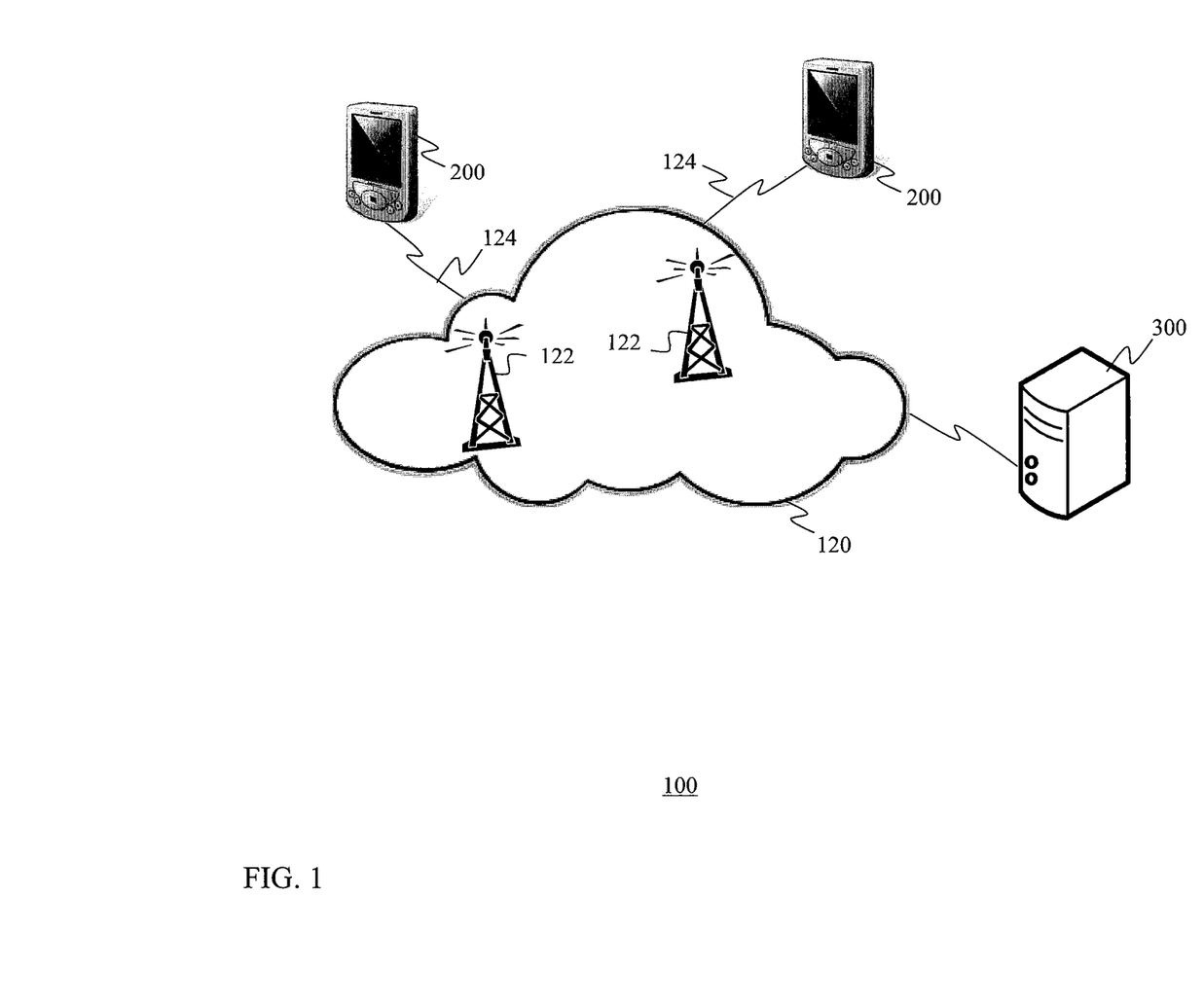
FIG. 1 is a diagram of an exemplary e-payment processing network, consistent with disclosed embodiments.

FIG. 1 is a diagram of an exemplary e-payment processing network, denoted generally as 100. As shown in FIG. 1, the e-payment processing network 100 includes a first electronic payment device 200a, a second electronic payment device 200b (collectively, payment devices 200), and a payment processing server 300. Although the e-payment processing network 100 may include only two payment devices 200, the e-payment processing network 100 typically may include a plurality of the payment devices 200. Moreover, although the e-payment processing network 100 includes only a single payment processing server 300, in additional embodiments, the e-payment processing network 100 may include a plurality of payment processing servers 300.

One or more of the electronic payment devices 200 may be implemented as a wireless communications device configured to operate within a wireless network. In certain aspects, the e-payment processing network 100 may also include a mobile communications network 120. The mobile communications network 120 may, for example, be configured as a WiFi network, a cellular network, or a combination thereof. As shown, the mobile communications network 120 includes a plurality of wireless base station subsystems 122. The payment devices 200 communicate with the base station subsystems 122 via wireless links 124, and the base station subsystems communicate with the payment processing server 300 via a wired, wireless or optical link. In some aspects, the base station subsystems 122 act as a bridge between the wireless links 124 and the e-payment processing network 100. Further, one or more of the electronic payment devices 200 may be implemented as a smartcard (e.g. an EMV payment card) that is configured to communicate with other payment devices 200, for example, using Bluetooth and/or Near Field Communications (NFC).

Figure 2:
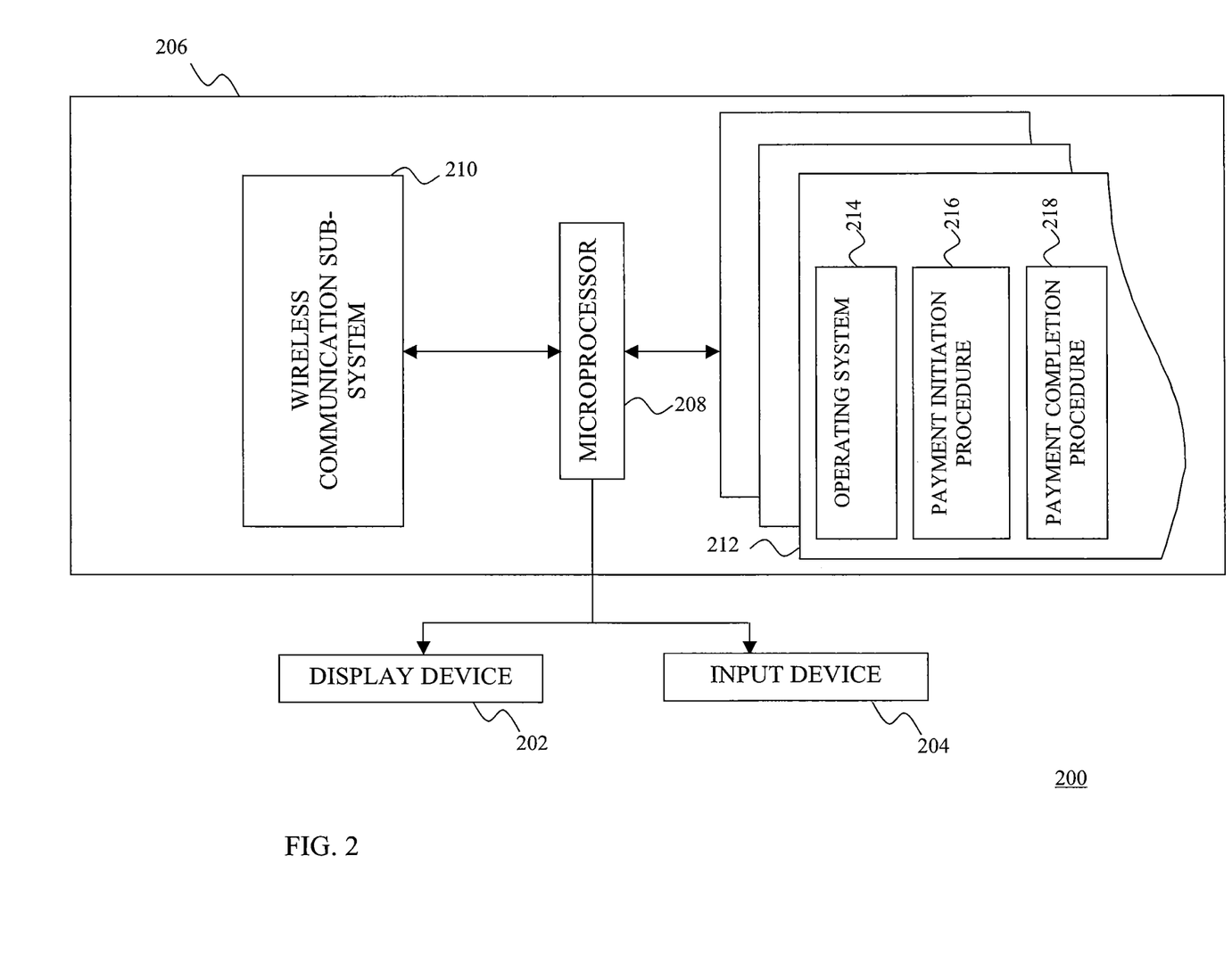
FIG. 2 is a diagram of an exemplary payment device, consistent with disclosed embodiments.

An exemplary electronic payment device (e.g., payment device 200a), implemented as a wireless communications device is depicted in FIG. 2. As shown in FIG. 2, the payment device 200a includes a display 202, a user input device 204, and a data processing system 206. The user input device 204 may be provided as a keyboard, biometric input device (e.g. microphone) and/or a touch-sensitive layer provided on the display 202. The data processing system 206 may include a microprocessor 208, a wireless communication sub-system 210 and a memory 212. In certain aspects, the communication sub-system 210, allows the payment device 200 to communicate with the mobile communications network 120. As discussed herein, the mobile communications network 120 may be configured as a WiFi network, a cellular network, or a combination thereof. In some embodiments, the communication sub-system 210 allows the payment device 200a to transmit and receive wireless communications signals over WiFi networks and/or cellular networks.

The memory 212 may include a tangible, non-transitory computer-readable medium, and may include non-transient computer processing instructions stored thereon which, when accessed from the memory 212 and executed by the microprocessor 208, implement an operating system 214, a payment initiation procedure 216, and a payment completion procedure 218. In some aspects, microprocessor 208 may be configured to implement the operating system 214 to display output on the display 202, to receive user input from the input device 204, and to send and receive communication signals over the wireless link 124 of the mobile communications network 120. The operation of the payment initiation procedure 216 and the payment completion procedure 218 will be discussed in greater detail below. In certain aspects, microprocessor 208 may be configured to implement the payment initiation procedure 216 to receive, from the user input device 204, particulars of a payment to be made from an account associated with a payor (e.g., a "payor account"), and to transmit the payment particulars to the payment processing server 300, via the mobile communications network 120. As will be discussed, the payment initiation request may identify a payment amount, and may excludes particulars of a payee and particulars of an account associated with the payee (e.g., a "payee account").

In some aspects, microprocessor 208 may be configured to implement the payment initiation procedure 216 to receive from the payment processing server 300, via the mobile communications network 120, a payment token generated in response to the payment particulars. The payment token may include, for example, an encoded electronic message, and the payment initiation procedure 216 may generate a visual representation of the payment token (e.g. a two-dimensional bar code (QR code)) and display the visual representation on the display 202 for capture by another payment device (e.g., payment device 200b). Alternately, the payment initiation procedure 216 implemented by microprocessor 208 may directly or indirectly wirelessly transmit the visual representation of the payment token to another payment device (e.g., payment device 200b). In other aspects, and instead of generating a visual representation of the payment token, payment device 200a, through the payment initiation procedure 216, may wirelessly transmit the payment token directly or indirectly to the other payment device 200b. As non-limiting examples, the payment device 200a may wirelessly transmit the payment token (or the visual representation thereof) directly to the other payment device 200b (for example via Bluetooth or NFC), or indirectly to the other payment device 200b (for example via WiFi or cellular communications) using a relay and proximity service, such as the relay service provided by Bump Technologies.

In some embodiments, payment device 200a, through the payment completion procedure 218 implemented by microprocessor 208, may receive a payment token from another payment device (e.g., payment device 200b), and may generate a payment completion request from the payment token. In certain aspects, the payment completion request may include a payee identifier that is uniquely associated with the payee, and may exclude the payment amount, the payor account and particulars of the payor. The visual representation of the payment token may have been displayed on the display 202 of the other payment device 200b, in which case payment device 200a may receive the payment token via an image capture device incorporated into the payment device 200a. Alternately, the payment device 200a may wirelessly receive the payment token (or the visual representation thereof) from the other payment device 200b. As non-limiting examples, the payment device 200a may receive the payment token directly from the other payment device 200b (for example, via Bluetooth or NFC), or indirectly (for example via WiFi or cellular communications) using a relay service.

In an embodiment, the payment device 200a may be implemented as a smartcard. The payment device 200a may, when configured as a smartcard, have a similar configuration to that described above in reference to FIG. 2, but without the display 202 and user input device 204, and with the communication sub-system 210 configured to allow the payment device 200 to communicate via Bluetooth and/or NFC. Further, in certain aspects, one or more payment tokens may be stored on the payment device 200a (configured as a smartcard) by the distributor thereof or during an e-payment registration process (described below), or dynamically generated by the payment initiation procedure 216 implemented by the payment device 200a in response to a payment request received from another payment device (e.g., payment device 200b).

In some embodiments, the payment processing server 300 may be implemented as a computer server, and may be configured to generate one or more electronic instructions that effect a transfer from a payor account to a payee account. In some aspects, the payment processing server 300 maintains the payor account and the payee account. By way of example, the payment processing server 300 may be associated with a financial institution (e.g., a financial institution server), the payor's account and/or the payee's account may include, but is not limited to, a savings account, a chequing account, a credit account and a line of credit account, and the payment processing server 300 may be used to transfer funds from the payor's account to the payee's account. In other embodiments, however, the payment processing server 300 may be used to facilitate a transfer of units other than funds. For example, the payor's account and the payee's account may include loyalty points accounts, and the payment processing server 300 may be used to facilitate a transfer of loyalty points from the payor's account to the payee's account.

Further, although the payment processing server 300, in this embodiment, may maintain both the payor's account and the payee's account, in additional embodiments, the payor's account and the payee's account may be maintained by respective account servers (e.g., associated with respective financial institution servers), and the payment processing server 300 may act as a trusted intermediary to the respective account servers. In certain aspects, the payment processing server 300 may effect the transfer of units (e.g. funds, points) from the payor's account to the payee's account via the payor account server and the payee account server.

Figure 3:
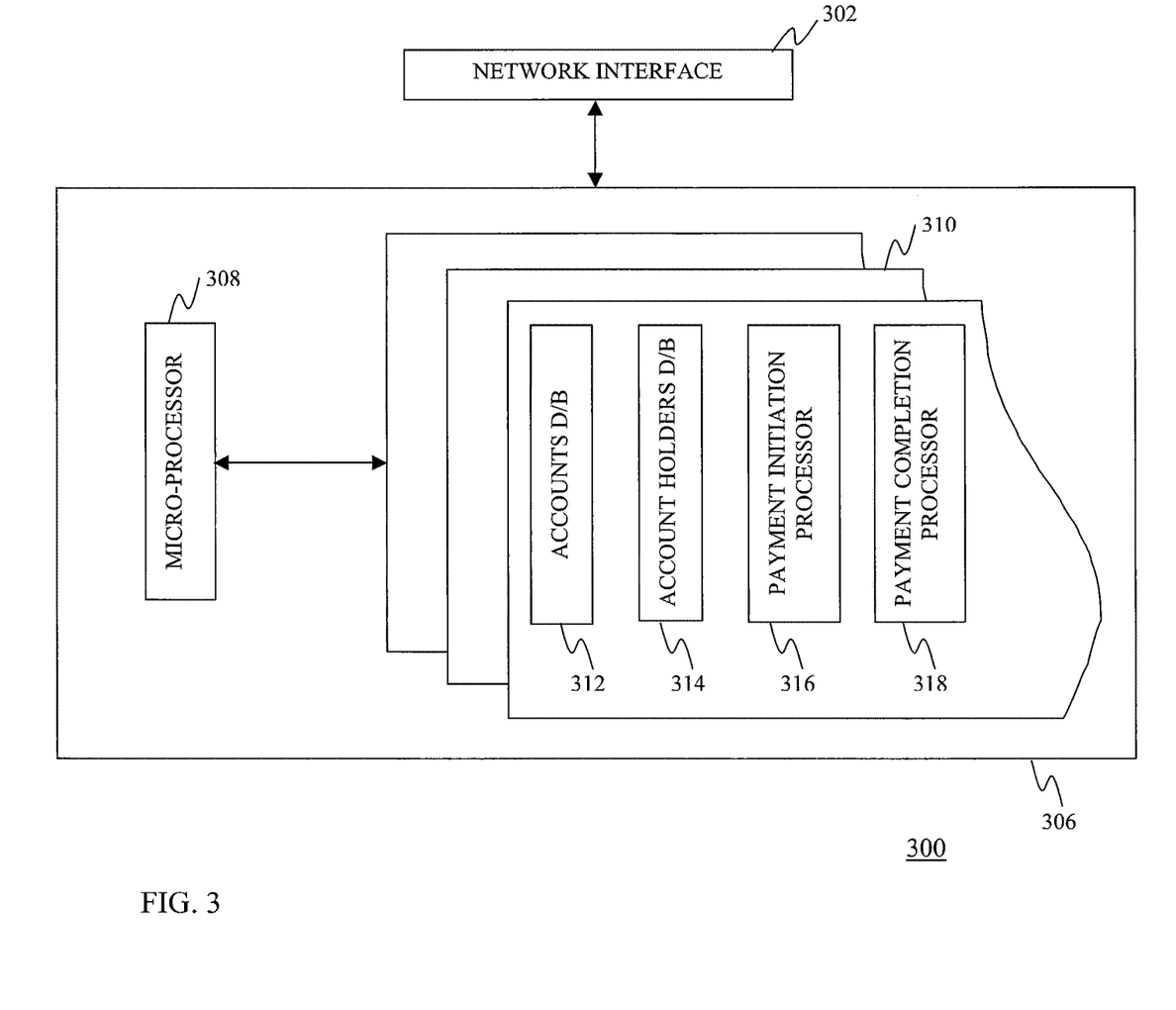
FIG. 3 is a diagram of an exemplary payment processing server, consistent with disclosed embodiments.

As shown in FIG. 3, the payment processing server 300 may include a network interface 302, and a computer processing system 306 that is coupled to the network interface 302. In some embodiments, the network interface 302 may interface the payment processing server 300 with the base station subsystems 122 of the mobile communications network 120 and may allow the payment processing server 300 to communicate with the communications payment devices 200. If the payment processing server 300 acts as a trusted intermediary to the payor's and the payee's respective account servers, the network interface 302 may also interface the payment processing server 300 with a payment network that comprises the account servers.

The computer processing system 306 may also include one or more microprocessors 308 and a computer-readable medium 310. The computer-readable medium 310 may be provided as tangible, non-transitory computer-readable medium, such as electronic computer memory (e.g. flash memory) or optical or magnetic memory (e.g. compact disc, hard disk).

The computer-readable medium 310 may maintain an accounts database 312 and an account holders database 314. The accounts database 312 may include a plurality of clusters, each associated with a respective payor or payee account. Each cluster may, for example, include a plurality of database records, each identifying a credit/deposit entry to the associated account. The account holders database 314 may include a plurality of clusters, each associated with a respective account holder (payor or payee). In some embodiments, each cluster saves an identifier that is uniquely associated with the respective account holder, and an identifier that is uniquely associated with the payment device (e.g., payment device 200a) used by the account holder.

The computer-readable medium 310 may also maintain non-transient computer processing instructions stored thereon which, when executed by the microprocessor(s) 308, define an operating system (not shown) that controls the overall operation of the payment processing server 300. The computer processing instructions may, upon implementation by microprocessor 308, also implement a payment initiation processor 316 and a payment completion processor 318.

The payment initiation processor 316 may be configured to receive, from a payor's payment device (e.g., payment device 200a), a payment initiation request to initiate a payment from a payor's account. The payment initiation request may identify a payment amount and exclude particulars of the payee and particulars of the payee's account. The payment initiation request may also include the payor identifier that is uniquely associated with the payor. Further, in some aspects, the payment initiation processor 316 may also be configured to generate a payment token from the payment initiation request, and to transmit the payment token to the payor's payment device 200a.

In some embodiments, microprocessor 308 may be configured to implement the payment completion processor 318 to receive, from a payee's payment device (e.g., payment device 200b) a payment completion request requesting completion of the payment. The payment completion request may include the payee identifier that is uniquely associated with the payee, and may exclude the payment amount, the payor's account and particulars of the payor (e.g., information identifying the payor).

In additional embodiments, the payment completion processor 318 may be configured by microprocessor 308 to confirm that the payment completion request is uniquely associated with the payee's payment device 200b and the payee identifier, and to determine the payment amount, the payor account and the payee account from the payment completion request. In certain aspects, the payment completion processor 318 may determine the payment amount and the payor account by correlating the payment completion request with the payment initiation request. Further, the payment completion processor 318 may also be configured to effect a transfer in the payment amount from the payor account to the payee account, in accordance with an outcome of the confirmation.

Although the payment initiation processor 316 and the payment completion processor 318 may be implemented through an execution of computer processing instructions by microprocessor 308, all or a portion of the functionality of the payment initiation processor 316 and/or the payment completion processor 318 may be implemented instead in electronics hardware or a special-purpose computer.

Figure 4:
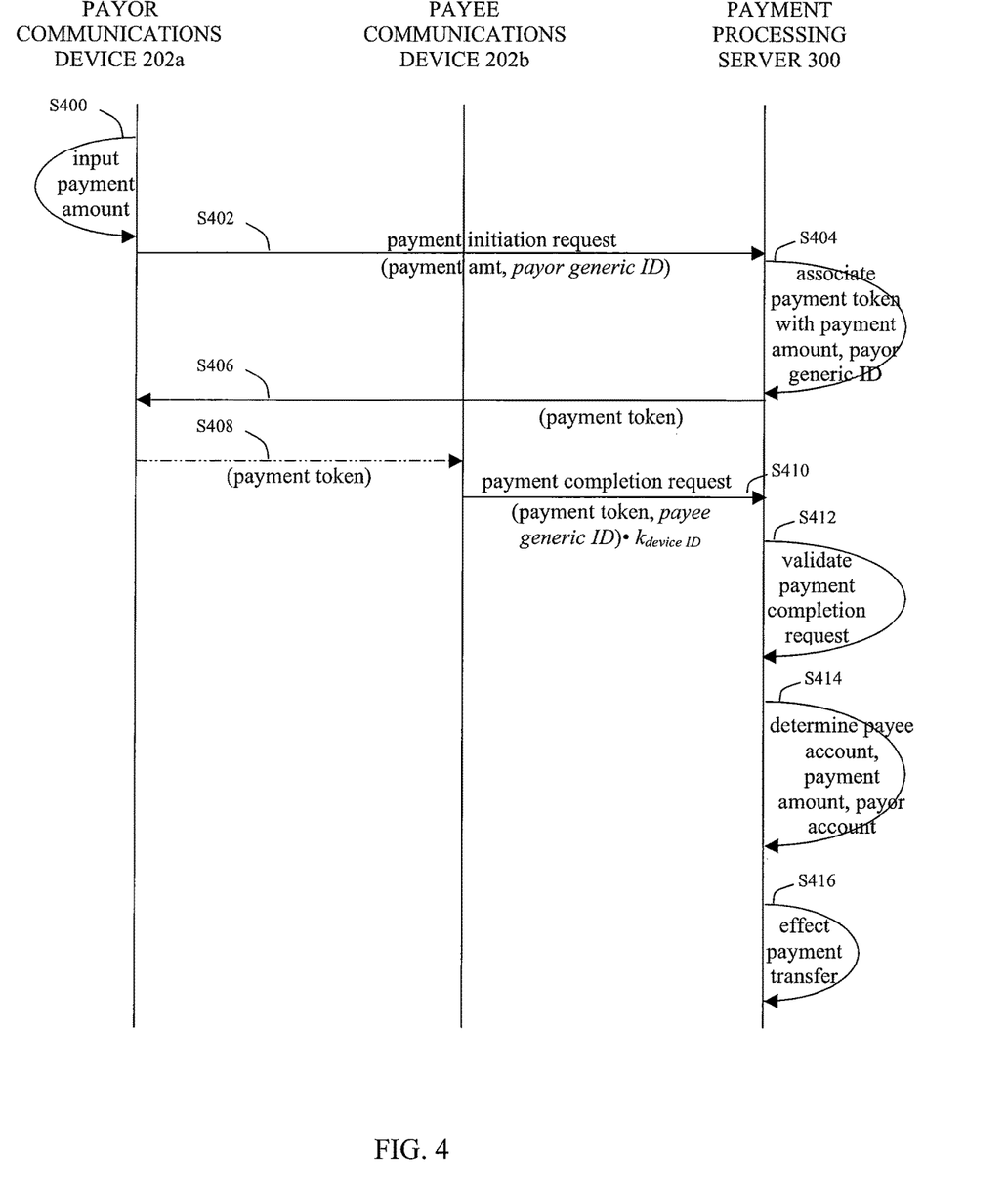
FIG. 4 is a message flow diagram of an exemplary method of person-to-person electronic payment, consistent with disclosed embodiments.

FIG. 4 illustrates an exemplary method of person-to-person electronic payment, which may be implemented using the e-payment processing network 100. By way of example, a person (e.g., a payor) may initiate an electronic payment to another person (e.g., a payee) by using the payor's payment device 200a to transmit to the payment processing server 300 a payment initiation request that identifies a payment amount and excludes particulars of the payee and particulars of the payee's account. The payee may initiate receipt of the electronic payment by using the payee's payment device 200b to transmit to the payment processing server 300 a payment completion request that requests completion of the payment, includes the payee's unique identifier, and excludes the payment amount, the payor account and particulars of the payor.

In some aspects, the payment processing server 300 may confirm that the payment completion request is uniquely associated with the payee payment device and the payee's unique identifier, and may determine the payment amount, the payor account and the payee account from the payment completion request. The payment processing server 300 may, for example, determine the payment amount and the payor account by correlating the payment completion request with the payment initiation request. The payment processing server 300 may effect a transfer in the payment amount from the payor account to the payee account in accordance with an outcome of the confirmation.

Referring back to FIG. 4, and at an outset of the method, the payor and the payee may each use their respective payment devices 200 (e.g., payment device 200a and 200b) to authenticate to the payment processing server 300. For example, the payment device 200a may communicate directly with the payment processing server 300, or indirectly via a communications appliance (for example, where the payment device 200a is implemented as a smartcard). In certain aspects, the user's payment device 200a establishes an encrypted communications channel with the payment processing server 300, and the device user (e.g., the payee) authenticates to the payment processing server 300 by transmitting to the payment processing server 300 over the encrypted communications channel the authentication credentials (e.g. payment card number and password) that the device user normally uses to initiate electronic banking with the payment processing server 300 (or with the user's financial institution server).

After successfully authenticating to the payment processing server 300, the device user uses its payment device 200a (or alternatively, a corresponding communications appliance) to invoke an e-payment registration process implemented by the payment processing server 300. In response, the payment processing server 300 may optionally prompt the device user to provide particulars of the account that the device user would like to use in an e-payment transaction (e.g., the account into/from which the device user would like the e-payment to be deposited/withdrawn).

The payment processing server 300 may also generate a pseudo-random user identifier (e.g., a generic ID), and saves the user's account particulars (if provided) and the user identifier (e.g., the generic ID) in the account holders database 314 in the database cluster associated with the device user. The payment processing server 300 may transmit the user identifier (e.g., the generic ID) to the user's payment device 200a for storage in the memory 212. The user identifier is globally unique in the sense that the user identifier (e.g., the generic ID) is assigned to only one user of the e-payment processing network 100.

In some aspects, the user identifier (e.g., the generic ID) is uniquely associated with the device user, but does not include any information that would allow a third party (other than the payment processing server 300) to identify the device user. For example, the user identifier (generic ID) may comprise a string consisting of the MAC address or the serial number of the user's payment device 200 and a pseudo-random number generated by the payment processing server 300. In certain aspects, the user identifier (e.g., the generic ID) may represent an anonymous identifier that is uniquely associated with the device user.

Where the payment device 200a is implemented as a smartcard, the payment processing server 300 may prompt the device user to enter a payment amount to be used on subsequent e-payment transactions. In some embodiments, the payment device 200a (e.g., implemented as a smartcard) may be configured to dynamically generate a payment token in response to a payment request received from another payment device 200 (e.g., payment device 200b). In certain aspects, the payment processing server 300 may save in the database cluster associated with the device user the serial number of the payment device 200a and a user pseudo-random counter value. As will be discussed below, the payment processing server 300 may change the pseudo-random counter value with each e-payment request using a corresponding algorithm, and the payment processing server 300 may use the pseudo-random counter value and the smartcard serial number to validate the payment token.

In other embodiments, the payment processing server 300 may generate one or more unique payment tokens each associated with the specified payment amount, may save the specified payment amount and the user identifier (e.g., the generic D) in the database cluster associated with the device user, and may associate each payment token with the user identifier (e.g., the generic ID) in the memory 310. The payment processing server 300 may, for example, transmit the payment token(s) to the payment device 200 for storage in the memory 212.

In additional embodiments, the payment device 200a, when implemented as a smartcard, may have been preconfigured with one or more payment tokens by the distributor of the payment device 200a. In certain aspects, the payment processing server 300 may save the specified payment amount and the user identifier (e.g., the generic ID) in the database cluster associated with the device user, and associate each preconfigured payment token with the user identifier (e.g., the generic ID) in the memory 310.

During the e-payment registration process described herein, the payment processing server 300 may also query the user's payment device 200a for an identifier (e.g., a device ID) that is associated with the payment device 200a, and save the device identifier (e.g., the device ID) in the account holders database 314 in the database cluster associated with the device user. In some aspects, the device identifier (e.g., the device ID) may include the International Mobile Equipment Identifier (IMEI) that is assigned to the user's payment device 200a. In other aspects, the payment processing server 300 may generate a pseudo-random device identifier, save the globally unique pseudo-random device identifier (e.g., the device ID) in the account holders database 314, and transmit the device identifier (e.g., the device ID) to the user's payment device 200a for storage in a protected memory of the payment device 200a.

In some embodiments, the device identifier (e.g., the device ID), whether provided by the user's payment device 200a or generated by the payment processing server 300, may be globally unique in the sense that the device identifier (e.g., the device ID) is assigned to only one payment device 200 of the e-payment processing network 100. As will be discussed below, the payment completion procedure 218 executed by the user's payment device 200a uses the device identifier (e.g., the device ID) to cryptographically sign a payment completion request that is generated by the payment completion procedure 218. To reduce the likelihood of a successful man-in-the-middle attack on the payment completion request, the device identifier (e.g., the device ID) may not be not widely published, or at least may not be widely known to be associated with the user identifier (e.g., the generic ID).

In some embodiments, the device identifier (e.g., the device ID) may act as a symmetric cryptographic key. In other embodiments, however, the payment processing server 300 may generate a cryptographic key from the device identifier (e.g., the device ID)), such that the device identifier (e.g., the device ID) and the generated cryptographic key act as an asymmetric cryptographic key pair. In some aspects, the payment processing server 300 may save the generated cryptographic key in the account holders database 314 instead of the device identifier (e.g., the device ID), and allows the payment completion procedure 218 to use the device identifier (e.g., the device ID) as the associated cryptographic key.

The registration process may, for example, terminate after the payment processing server 300 confirms to the user's payment device 200a that it has saved the user identifier (e.g., the generic ID) in the account holders database 314. After the registration process has been completed, the device user can use the e-payment processing network 100 to send/receive an e-payment.

Referring back to FIG. 4, to initiate an e-payment, at step S400 the payor may invoke the payment initiation procedure 216 on the payor's payment device 200a, and may input the payment amount into the payor's payment device 200a via the input device 204. The payor's payment device 200a may execute the payment initiation procedure 216 to establish a secure communications channel with the payment processing server 300 via the mobile communications network 120, generate a payment initiation request, and transmit the payment initiation request to the payment processing server 300 via the secure channel (e.g., at step S402).

In certain aspects, the payment initiation request identifies the payment amount, but does not include particulars of the payee (e.g., payee information) or particulars of the payee's account (e.g., payee account information). If, during the e-payment registration process, the payor did not provide the payment processing server 300 with particulars of the payor's account (or alternatively, if the payor wishes to override the account particulars that the payor provided during the e-payment registration process), the payor may input the payer's account particulars into the payer's payment device 200a, in which case the payment initiation request may include (or accompany) the payor's account particulars.

The payment initiation request may also include the payer's user identifier (e.g., a payor generic ID). In other aspects, the payment processing server 300 may query the payor's payment device 200a for the payer's user identifier (e.g., the payor generic ID) in response to a receipt of the payment initiation request by the payment processing server 300 receives the payment initiation request.

In response to the payment initiation request, the payment initiation processor 316 of the payment processing server 300 may generate a pseudo-random payment token, and may associates the payment token with the received payment amount and the payor's user identifier (e.g., the payor generic ID) in the memory 310 (e.g., at step S404). In some aspects, the payment initiation processor 316 may also generate a time stamp after it generates the payment token, and associates the time stamp with the payment token in the memory 310. As will be discussed below, the time stamp allows the payment processing server 300 to assign a maximum lifetime period to the payment token, after which the payment token will be considered to have expired.

In other aspects, the payment token may not identify the payment amount or the payor account, or include the time stamp or any identification particulars of the payor. In some embodiments, the payment token may represent an anonymous identifier that is uniquely associated with the proposed payment. The payment token may also be globally unique in the sense that, during the lifetime (if assigned) of the payment token, the payment token is only associated with this particular payment initiation request. At step S406, the payment processing server 300 (e.g., by executing the payment initiation processor 316) may transmit the payment token to the payor's payment device 200a for storage in the memory 212.

In certain embodiments, steps S400 to S406 may not be required, for example where the payment device 200a is implemented as a smartcard. As discussed herein, when implemented as a smartcard, the payment device 200a may be preconfigured with one or more payment tokens, each associated with the same payment amount or different payment amounts, either by the distributor of the payment device 200a or by the e-payment registration process. In other aspects, the payment device 200a (e.g., by executing payment initiation procedure 216) may generate the payment token in response to a payment request received at the payment device 200a from another payment device 200b. For example, the payment token may include the serial number of the payment device (smartcard) 200 and a cryptogram that is generated using the payor generic ID and a pseudo-random counter value as inputs to a cryptographic algorithm.

At step S408, the payer's payment device 200a may transmit the payment token to the payee's payment device 200b. To do so, the payment initiation procedure 216 executed by the payor's payment device 200a may generate a visual representation of the payment token (e.g. a two-dimensional bard code (QR code)) and display the visual representation on the display 202 of the payor's payment device 200a. Alternately, the payment initiation procedure 216 of the payor's payment device 200a may wirelessly transmit the payment token directly (for example via NFC) or indirectly (for example via WiFi or cellular communications) to the payee's payment device 200b.

Depending upon the maximum lifetime period assigned to the payment token, the payor's payment device 200a may immediately transmit the payment token to the payee's payment device 200b to thereby initiate an immediate payment, or save the payment token for use at a later time/date. Optionally, in some aspects, the payor's payment device 200a may be configured to prompt the user of the payor's payment device 200a to confirm the payment amount prior to generating the visual representation or wirelessly transmitting the payment token. The disclosed embodiments may be configured in this manner when, for example, the payment device 200a is implemented as a smartcard that is preconfigured with multiple payment tokens, each associated with different payment amounts. In other aspects, the disclosed embodiments may be configured to ensure that the payor did not inadvertently enter the incorrect payment amount at step S402.

As discussed herein, the payment token may represent an anonymous identifier that is uniquely associated with the proposed payment. In certain aspects, the payment token may not provide the payee with any particulars of the proposed e-payment (e.g. a payment amount, a payor account, a time stamp, and/or payor identification particulars).

To initiate receipt of the payment token, the payee may execute the payment completion procedure 218 on the payee's payment device 200b and select one of the available reception methods offered by the payment completion procedure 218. If the payor's payment device 200a displayed a visual representation of the payment token on the display 202 of the payor's payment device 200a, the payee's payment device 200b may implement the payment completion procedure 218 to receive the payment token via an image capture device of the payee's payment device 200b. If the payor's payment device 200a wirelessly transmitted the payment token, the payee's payment device 200b may implement the payment completion procedure 218 to wirelessly receive the payment token directly (for example via NFC) or indirectly (for example via WiFi or cellular communications).

After receiving the payment token, the payee's payment device 200b may execute payment completion procedure 218 and establish a secure communications channel with the payment processing server 300 via the mobile communications network 120, generate a payment completion request, and transmit the payment completion request to the payment processing server 300 via the secure channel (e.g., at step S410). The payment completion request may include the payee's user identifier (e.g., the payee generic ID) and the payment token, but may not identify the payment amount or include particulars of the payor or particulars of the payor's account.

In some embodiments, the payment completion request also fails to not include particulars of the payee's account. However, if, during the e-payment registration process, the payee, through the payee's payment device 200b, did not provide the payment processing server 300 with particulars of the payee's account (or the payee wishes to over-ride the account particulars that the payee provided during the e-payment registration process), the payee may input the payee's account particulars into the payee's payment device 200b, in which case the payment completion request may include the payee's account particulars. To reduce the likelihood of a successful man-in-the-middle attack, the payee's payment device 200b may execute the payment completion procedure 218 to cryptographically sign the payment completion request with the device identifier (e.g., the device ID) that was assigned to the payee's payment device 200b.

After receiving the payment completion request, at step S412. the payment processing server 300 (e.g., by executing the payment completion processor 318) may validate the payment completion request. To do so, the payment processing server 300 may extract the payee's user identifier (e.g., the payee generic ID) from the payment completion request, and may query the account holders database 314 with the extracted user identifier (e.g., the payee generic ID). If the payment completion procedure 218 executed by the payee's payment device 200b used the device identifier (e.g., the device ID) as a symmetric cryptographic key, the query may return the payee's device identifier (e.g., the device ID), in which case the payment processing server 300 may use the located device identifier (e.g., the device ID) to validate the digital signature on the payment completion request. However, if the payee's payment device 200b (e.g., through payment completion procedure 218) used the device identifier (e.g., the device ID) as an asymmetric cryptographic key, the query may return the cryptographic key associated with the device identifier (device ID), in which case the payment completion processor 318 uses the located cryptographic key to validate the digital signature on the payment completion request.

As will be appreciated, regardless of the type of cryptographic key used, the payment completion processor 318) may be configured by payment processing server 300 to confirm the payment completion request using the cryptographic key that is associated with the payee's user identifier (e.g., the payee generic ID). Further, when validating the digital signature, the payment completion processor 318 also indirectly confirms that the cryptographic key saved in the account holders database 314 is uniquely associated with the payee's payment device 200b and is uniquely associated with the payee's user identifier (e.g., the payee generic ID) that was included in the payment completion request. Accordingly, the payment completion processor 318) may validate the payment completion request by confirming that the payment completion request is uniquely associated with the payee's payment device 200b and the payee's user identifier (e.g., the payee generic ID).

After validating the payment completion request, the payment processing server 300 may execute the payment completion processor 318 to determine the payee account, the payment amount, and the payor account from the payment completion request (e.g., at step S414). By way of example, to determine the payee account, the payment completion processor 318 may query the account holders database 314 with the payee's user identifier (e.g., the payee generic ID) for the payee's account particulars.

In certain aspects, the payment completion processor 318 may be configured by payment processing server 300 to determine the payment amount and the payor account by correlating the payment completion request with the payment initiation request. To do so, the payment completion processor 318 may query the memory 310 with the payment token (e.g., included in the payment completion request) to locate the payment amount and the payor generic ID. The payment completion processor 318 may query the account holders database 314 with the payor's user identifier (e.g., payor generic ID) for the payor's account particulars.

Where the payment token was generated by the payment device 200a, the payment completion processor 318 may validate the payment token by (i) querying the account holders database 314 with the serial number that was included in the payment token to locate the associated payor generic ID and associated pseudo-random counter value, (ii) using the located payor generic ID and pseudo-random counter value as inputs to a cryptographic algorithm, and (iii) confirming that the output of the cryptographic algorithm matches the cryptogram that was included in the payment token. If the payment token is validated, the payment completion processor 318 may then query the account holders database 314 with the payor generic ID to locate the payment amount. In certain aspects, the payment token may be generated from a pseudo-random counter value that changes with each e-payment transaction, the payment token cannot be used to effect multiple fraudulent transfers from the payor's account. Therefore, the likelihood of replay attacks is reduced.

The payment completion processor 318 may also be configured by payment processing server 300 to confirm that the payment token has not expired. To do so, the payment completion processor 318 may query the memory 310 with the payment token to locate the timestamp associated with the payment initiation request. If the payment completion processor 318 successfully validated the payment completion request (and payment token), and optionally the timestamp reveals that the payment token has not expired, at step S416 the payment completion processor 318 may delete the payment token from the memory 310, and effect a transfer in the payment amount from the payor account to the payee account. The payment processing server 300 may also periodically purge expired payment tokens from the memory 310, to prevent the unauthorized use of unused stale payment tokens.

If the payment processing server 300 maintains the payor and payee accounts in the accounts database 312, the payment processing server 300 may effect the transfer by updating the credit/deposit entries in their respective accounts. However, if the payor account and the payee account are maintained by respective account servers, the payment processing server 300 effects the transfer by communicating particulars of the transfer to the payor's account server.

The payment processing server 300 may also be configured to process repudiation requests received from payors' payment devices 200*a*. In certain aspects, the repudiation request may include the payor generic ID, and the payment processing server 300 may be configured to purge the corresponding payment token from the memory 310 in response to the repudiation request to thereby allow the payor to abort an e-payment transfer before the payment processing server 300 effects the transfer in the payment amount from the payor account.

The payment processing server 300 may also be configured to process change requests received from payors' payment devices 200*a*. In certain aspects, the variation request may include the payor generic ID and an alternate payment amount, and the payment processing server 300 may be configured to update the payment amount associated with the payment token, to thereby allow the payor to change the payment amount before the payment processing server 300 effects the transfer in the payment amount from the payor account.

Since, prior to effecting the payment transfer, the payment processing server 300 confirms that the payment completion request is uniquely associated with the payee's payment device 200*b* and the payee's user identifier (payee generic ID), the likelihood of the e-payment being subject to a successful man-in-the-middle attack may be reduced.

Certain aspects of the disclosures described herein include process steps and instructions described herein in the form of an algorithm. It should be noted that the process steps and instructions of the consistent with the disclosed embodiments can be embodied in software, firmware or hardware, and when embodied in software, can be downloaded to reside on and be operated from different platforms used by real time network operating systems.

Also described herein are exemplary apparatuses, systems, and devices for performing the operations herein. These apparatuses, systems, and devices may be specially constructed for the required purposes, or may comprise a general-purpose computer selectively activated or reconfigured by a computer program stored in the computer. Such a computer program may be stored in a tangible, non-transitory computer readable storage medium, such as, but is not limited to, any type of disk including floppy disks, optical disks, CD-ROMs, magnetic-optical disks, read-only memories (ROMs), random access memories (RAMs). EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the embodiments described herein are not described with reference to any particular programming language. It is appreciated that a variety of programming languages may be used to implement the disclosed embodiments, and any references to specific languages are provided for disclosure of enablement and best mode.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

The invention claimed is:

1. A method of person-to-person anonymous electronic payment processing executable by a payment processing server, the method comprising the payment processing server:
   receiving a payee identifier from a payee communication device, and linking the payee identifier to a device identifier identifying the payee communication device, wherein the linking the payee identifier to the device identifier comprises:
   the payment processing server generating a cryptographic key from the device identifier; and
   the payment processing server linking the payee identifier to the cryptographic key;
   receiving from a payor communication device a payment initiation request identifying a specified payment amount and a payor identifier, linking a unique token to the specified payment amount and to the payor identifier, and providing the payor communications device with the token, the unique token excluding the payor identifier and particulars of a payor associated with the payor identifier;
   receiving a payment completion request including the payee identifier and the token and excluding the specified payment amount, the payor identifier and the particulars of the payor;
   using the payee identifier to confirm that the payment completion request was signed with the device identifier, using the payee identifier to locate a payee account, and using the token to determine the specified payment amount and a payor account associated with the payor identifier, wherein the using the payee identifier to confirm the payment completion request comprises the payment processing server validating the payment completion request using the cryptographic key linked to the payee identifier; and
   initiating a transfer in the specified payment amount from the payor account to the payee account.

2. The method according to claim 1, wherein the linking the payee identifier to the device identifier comprises the payment processing server generating a unique device identifier, linking the payee identifier to the unique device identifier, and providing the payee communications device with the unique device identifier.

3. The method according to claim 1, wherein the payee communication device is pre-configured with a unique international mobile equipment identifier, the receiving the payee identifier comprises the payment processing server receiving the payee identifier and the international mobile equipment identifier from the payee communication device, and the linking the payee identifier to the device identifier comprises the payment processing server linking the payee identifier to the international mobile equipment identifier.

4. The method according to claim 1, wherein the payor account is linked to the payor identifier in a database, and the using the token to determine the payor account comprises the payment processing server using the unique token to locate the payor identifier, and querying the database with the located payor identifier.

5. The method according to claim 1, further comprising the payment processing server receiving a repudiation request including the payor identifier, and unlinking the token from the payment amount and the payor identifier.

6. The method according to claim 1, further comprising, after linking the token to the specified payment amount, the payment processing server receiving from the payor payment device a change request including the payor identifier and a modified payment amount, and updating the specified payment amount with the modified payment amount.

7. A payment processing server comprising:
a memory; and
at least one processor coupled to the memory and configured to:
receive a payee identifier from a payee communication device, and in the memory link the payee identifier to a device identifier identifying the payee communication device;
receive from a payor communication device a payment initiation request identifying a specified payment amount and a payor identifier, in the memory link a unique token to the specified payment amount and to the payor identifier, and provide the payor communications device with the token, the unique token excluding the payor identifier and particulars of a payor associated with the payor identifier;
receive a payment completion request including the payee identifier and the token and excluding the specified payment amount, the payor identifier and the particulars of the payor;
use the payee identifier to confirm that the payment completion request was signed with the device identifier, use the payee identifier to locate a payee account, and query the memory with the token for the specified payment amount and a payor account associated with the payor identifier; and
initiate a transfer in the specified payment amount from the payor account to the payee account, and wherein the at least one processor is further configured to:
generate a cryptographic key from the device identifier;
link the payee identifier to the cryptographic key; and
confirm the payment completion request by validating the payment completion request using the cryptographic key linked to the payee identifier.

8. The payment processing server according to claim 7, wherein the at least one processor is configured to, in response to receiving the payee identifier, generate a unique device identifier, link the payee identifier to the unique device identifier, and provide the payee communications device with the unique device identifier.

9. The payment processing server according to claim 7, wherein the payor account is linked to the payor identifier in a database, and the at least one processor is configured to use the unique token to locate the payor identifier, and determine the payor account by querying the database with the located payor identifier.

10. The payment processing server according to claim 7, wherein the at least one processor is configured to receive a repudiation request including the payor identifier, and to unlink the token from the payment amount and the payor identifier.

11. The payment processing server according to claim 7, wherein the at least one processor is configured, after linking the token to the specified payment amount, receive from the payor payment device a change request including the payor identifier and a modified payment amount, and update the specified payment amount with the modified payment amount.

12. A tangible non-transient computer-readable medium carrying computer processing instructions stored thereon which, when executed by a computer, cause the computer to perform a sequence comprising:
receiving a payee identifier from a payee communication device, and linking the payee identifier to a device identifier identifying the payee communication device, wherein the linking the payee identifier to the device identifier comprises generating a cryptographic key from the device identifier and linking the payee identifier to the cryptographic key;
receiving from a payor communication device a payment initiation request identifying a specified payment amount and a payor identifier, linking a unique token to the specified payment amount and to the payor identifier, and providing the payor communications device with the token, the unique token excluding the payor identifier and particulars of a payor associated with the payor identifier, wherein the using the payee identifier to confirm the payment completion request comprises validating the payment completion request using the cryptographic key linked to the payee identifier;
receiving a payment completion request including the payee identifier and the token and excluding the specified payment amount, the payor identifier and the particulars of the payor;
using the payee identifier to confirm that the payment completion request was signed with the device identifier, using the payee identifier to locate a payee account, and using the token to determine the specified payment amount and a payor account associated with the payor identifier; and
initiating a transfer in the specified payment amount from the payor account to the payee account.

13. The computer-readable medium according to claim 12, wherein the linking the payee identifier to the device identifier comprises generating a unique device identifier, linking the payee identifier to the unique device identifier, and providing the payee communications device with the unique device identifier.

14. The computer-readable medium according to claim 12, further comprising, after linking the token to the specified payment amount, receiving from the payor payment device a change request including the payor identifier and a modified payment amount, and updating the specified payment amount with the modified payment amount.

* * * * *